US012739426B2

(12) United States Patent
Krivokuća et al.

(10) Patent No.: US 12,739,426 B2
(45) Date of Patent: Sep. 15, 2026

(54) MOTION CODING FOR DYNAMIC MESHES USING INTRA-AND INTER-FRAME GRAPH FOURIER TRANSFORMS

(71) Applicant: InterDigital CE Patent Holdings, SAS, Paris (FR)

(72) Inventors: Maja Krivokuća, Cesson-Sevigne (FR); Jean-Eudes Marvie, Plerin (FR); Olivier Mocquard, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 19/110,726

(22) PCT Filed: Oct. 4, 2023

(86) PCT No.: PCT/EP2023/077377
§ 371 (c)(1),
(2) Date: Mar. 11, 2025

(87) PCT Pub. No.: WO2024/078925
PCT Pub. Date: Apr. 18, 2024

(65) Prior Publication Data

US 2026/0095586 A1 Apr. 2, 2026

(30) Foreign Application Priority Data

Oct. 14, 2022 (EP) .................................... 22306565

(51) Int. Cl.
*H04N 19/54* (2014.01)
*H04N 19/139* (2014.01)
(Continued)

(52) U.S. Cl.
CPC ........... *H04N 19/54* (2014.11); *H04N 19/139* (2014.11); *H04N 19/184* (2014.11); *H04N 19/52* (2014.11); *H04N 19/61* (2014.11)

(58) Field of Classification Search
CPC .... H04N 19/54; H04N 19/139; H04N 19/184; H04N 19/52; H04N 19/61
See application file for complete search history.

(56) References Cited

U.S. PATENT DOCUMENTS 10,499,054 B2 * 12/2019 Tian ........................ G06T 9/004
2019/0354832 A1 * 11/2019 Bronstein .............. G06F 17/11
(Continued)

OTHER PUBLICATIONS

Tian et al., "CDVA CE2: Graph transform for keypoint trajectory coding", International Organization for Standardization, ISO/IEC JTC1/SC29/WG11, Coding of Moving Pictures and Audio, ISO/IEC JTC1/SC29/WG11 MPEG2016/m38671, Geneva, Switzerland, May-Jun. 2016, 8 pages.
(Continued)

*Primary Examiner* — Richard T Torrente
(74) *Attorney, Agent, or Firm* — Smadar Gefen

(57) ABSTRACT

Apparatuses and methods are disclosed for encoding and for decoding mesh data. Disclosed encoding techniques include receiving a mesh sequence, including geometry data of vertices of meshes in the sequence and coding motion data into a bitstream of coded mesh data. The motion data coding comprises transforming, based on a Graph Fourier Transform (GFT), the geometry data to obtain GFT coefficients representative of the motion data, and then coding the GFT coefficients into the bitstream. Disclosed decoding techniques include receiving a bitstream of coded mesh data, including coded motion data and decoding the motion data from the bitstream. The decoding of the motion data comprises decoding GFT coefficients representative of the motion data, and then inverse transforming, based on the
(Continued)

GFT, the decoded GFT coefficients to obtain decoded geometry data of vertices of meshes in the sequence.

24 Claims, 8 Drawing Sheets

(51) Int. Cl.
*H04N 19/184* (2014.01)
*H04N 19/52* (2014.01)
*H04N 19/61* (2014.01)

(56) References Cited

U.S. PATENT DOCUMENTS

| | | | | |
|---|---|---|---|---|
| 2020/0288129 | A1* | 9/2020 | Egilmez | H04N 19/12 |
| 2021/0127137 | A1* | 4/2021 | Egilmez | H04N 19/18 |
| 2021/0243441 | A1* | 8/2021 | Egilmez | H04N 19/176 |
| 2024/0202982 | A1* | 6/2024 | Dai | G06T 9/40 |

OTHER PUBLICATIONS

Ortega et al., "Graph Signal Processing: Overview, Challenges, and Applications", proceedings of the IEEE, vol. 106, No. 5, May 2018, pp. 808-828.
Xu et al., "Predictive Generalized Graph Fourier Transform for Attribute Compression of Dynamic Point Clouds", arXiv:1908.01970v1 [cs.MM] Aug. 6, 2019, 12 pages.
"CfP for Dynamic Mesh Coding", ISO/IEC JTC 1/SC 29/WG 7, N231, MPEG 3D Graphics Coding Convenorship: AFNOR (France), Oct. 29, 2021, 38 pages.
Hammond et al., "Wavelets on graphs via spectral graph theory", Applied and Computational Harmonic Analysis, vol. 30, ELSEVIER, 2011, pp. 129-150.
Mammou et al., "[V-CG] Apple's Dynamic Mesh Coding CfP Response", Apple Inc., ISO/IEC JTC 1/SC 29/WG 7 m59281, 24 pages, Apr. 2022.
Tian et al., "CDVA CE2: Graph transform for keypoint trajectory coding", International Organization for Standardization, ISO/IEC JTC1/SC29/WG11, Coding of Moving Pictures and Audio, ISO/IEC JTC1/SC29/WVG11 MPEG2016/m38671, Geneva, Switzerland, May-Jun. 2016, 8 pages.
Karni et al., "Spectral Compression of Mesh Geometry", Computer Science Department Technion—Israel Institute of Technology Haifa 32000, Israel, Aug. 2001, 9 pages.
Yang et al., "Motion-Aware Compression and Transmission of Mesh Animation Sequences", ACM Transations On Intelligent Systems and Technology, Association for Computing Machinery Corporation, vol. 10, No. 3, Apr. 29, 2019, pp. 1-12.
Anis et al., "Compression of Dynamic 3D Point Clouds Using Subdivisional Meshes and Graph Wavelet Transforms", 2006 IEEE International Conference On Acoustics, Speech and Signal Processing (ICASSP), Mar. 1, 2016, 5 pages.
Taubin, "A Signal Processing Approach to Fair Surface Design", IBM T.J.Watson Research Center, 8 pages. Sep. 15, 1995.
Thanou et al., "Graph-Based Compression of Dynamic 3D Point Cloud Sequences", IEEE Transactions On Image Processing, vol. 25, No. 4, Apr. 2016, pp. 1765-1778.
Arvanitis et al., "Fast Spatio-temporal Compression of Dynamic 3DMeshes", Arxiv.Org, Cornell University Library, Nov. 19, 2021, 7 pages.

* cited by examiner

100

200

300 m(i)
QUANTIZER
420
qm(i)
STATIC MESH ENCODER
440
MOTION ENCODER
450
m'(j)
460
BASE MESH BITSTREAM
480

400
BASE MESH BITSTREAM
520
m'(j)
STATIC MESH DECODER
540
MOTION DECODER
550
m'(i)
INVERSE QUANTIZER
560
m''(i)

600

800

900

MOTION CODING FOR DYNAMIC MESHES USING INTRA-AND INTER-FRAME GRAPH FOURIER TRANSFORMS

CROSS REFERENCE TO RELATED APPLICATIONS

This application is a U.S. National Stage Application under 35 U.S.C. 371 of International Patent Application No. PCT/EP2023/077377 filed Oct. 4, 2023, which claims the benefit of European Patent Application No. 22306565.7 filed Oct. 14, 2022, which are all incorporated herein by reference in their entirety.

BACKGROUND

Computer generated or camera captured objects are commonly modeled by dynamic meshes. A significant amount of data is required for high quality representation and rendering of content containing dynamic meshes. Moreover, efficient compression techniques are instrumental in delivering such content to consumers and storing it. Generally, the geometry of a mesh (vertex positions) can be encoded directly or relative to the geometry of a reference mesh. In the latter, a motion field that represents the spatial relationship between the mesh and the reference mesh is encoded. Motion data of the encoded motion field typically contain spatial and temporal correlations. Taking advantage of spatiotemporal correlations present in the motion data when devising a coding technique can lead to a computationally efficient compression process.

SUMMARY

Apparatuses and methods are disclosed herein for encoding motion data, a component in the encoding process of dynamic meshes. As disclosed herein, motion vectors that represent displacements between corresponding vertices of respective meshes in a sequence are represented in a Graph Fourier Transform (GFT) domain. The GFT can be derived based on intra-frame mesh connectivity or based on inter-frame mesh connectivity. In the former, explicit motion data representation is utilized, while, in the latter, implicit motion data representation is utilized, as disclosed herein. Using a GFT domain to represent motion data allows for more signal correlations to be discovered and taken advantage of than when using the spatial domain to represent the motion data, which in turn can lead to reduced bitrates for motion coding. In addition, representing motion data by spectral coefficients (i.e., GFT coefficients) allows for a progressive reconstruction of the mesh geometry—that is, progressively increasing accuracy of the reconstructed vertex positions of the dynamic mesh. Techniques disclosed herein for encoding motion data have low computational complexity and thus can be executed in real-time.

Aspects disclosed in the present disclosure describe methods for encoding mesh data. These methods comprise receiving a mesh sequence, including geometry data of vertices of meshes in the sequence, and then coding motion data into a bitstream of coded mesh data. The motion data represent spatial displacements between corresponding vertices from respective meshes in the mesh sequence. The motion data coding comprises transforming, based on a GFT, the geometry data to obtain GFT coefficients representative of the motion data, and then coding the GFT coefficients into the bitstream. Aspects disclosed herein also describe methods for decoding the mesh data. These methods comprise receiving a bitstream of coded mesh data, including coded motion data, and decoding the motion data from the bitstream. The decoding of the motion data comprises decoding GFT coefficients representative of the motion data, and then inverse transforming, based on the GFT, the decoded GFT coefficients to obtain decoded geometry data of vertices of meshes in the sequence.

Aspects disclosed in the present disclosure describe an apparatus for encoding mesh data. The apparatus comprises at least one processor and memory storing instructions. The instructions, when executed by the at least one processor, cause the apparatus to receive a mesh sequence, including geometry data of vertices of meshes in the sequence, and to code motion data into a bitstream of coded mesh data. The motion data represent spatial displacements between corresponding vertices from respective meshes in the sequence. The motion data coding comprises transforming, based on a GFT, the geometry data to obtain GFT coefficients representative of the motion data, and then coding the GFT coefficients into the bitstream. Aspects disclosed in the present disclosure also describe an apparatus for decoding mesh data. The apparatus comprises at least one processor and memory storing instructions. The instructions, when executed by the at least one processor, cause the apparatus to receive a bitstream of coded mesh data, including coded motion data, and to decode the motion data from the bitstream. The motion data decoding comprises decoding GFT coefficients representative of the motion data, and then inverse transforming, based on the GFT, the decoded GFT coefficients to obtain decoded geometry data of vertices of meshes in the sequence.

Aspects disclosed in the present disclosure describe a non-transitory computer-readable medium comprising instructions executable by at least one processor to perform methods for encoding mesh data. These methods comprise receiving a mesh sequence, including geometry data of vertices of meshes in the sequence, and coding motion data into a bitstream of coded mesh data. The motion data represent spatial displacements between corresponding vertices from respective meshes in the mesh sequence. The motion data coding comprises transforming, based on a GFT, the geometry data to obtain GFT coefficients representative of the motion data, and then coding the GFT coefficients into the bitstream. Aspects disclosed in the present disclosure also describe a non-transitory computer-readable medium comprising instructions executable by at least one processor to perform methods for decoding the mesh data. These methods comprise receiving a bitstream of coded mesh data, including coded motion data, and decoding the motion data from the bitstream. The decoding of the motion data comprises decoding GFT coefficients representative of the motion data, and then inverse transforming, based on the GFT, the decoded GFT coefficients to obtain decoded geometry data of vertices of meshes in the sequence.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

This disclosure applies to the field of motion data computation and coding in the context of dynamic mesh compression. Recently, the MPEG 3D Graphics Coding (MPEG-3DGC) group called for proposals (CfP) for codec technologies relating to the compression of time-varying volumetric meshes (V-Mesh). See, CfP for Dynamic Mesh Coding, ISO/IEC JTC 1/SC 29/WG 7, 2021. In response, the solution proposed by Mammou et al. was selected to become the MPEG V-Mesh Test Model that will be used as a basis for future developments of this standard. See, K. Mammou, J. Kim, A. Tourapis, D. Podborski and K. Kolarov, "MPEG input document m59281-v4—[V-CG] Apple's Dynamic Mesh Coding CfP Response," ISO/IEC JTC 1/SC 29/WG 7, 2022 ("Mammou").

As further described herein, the dynamic mesh coding described in Mammou suggests to first decompose a given mesh to be encoded into a base mesh and displacement vectors that represent the spatial difference between the given mesh and the base mesh. Then, to encode separately the base mesh and the displacement vectors. The encoding of a base mesh may be performed by any static mesh coding technique or in reference to a previously encoded base mesh (that is, a reference base mesh). In the latter, motion vectors that represent the displacements between corresponding vertices of the base mesh and the reference base mesh are encoded. Aspects of the present disclosure describe alternative techniques to compute and encode these motion vectors. Although, these aspects are disclosed herein in the context of encoding the base mesh as described in Mammou and as applied to the V-MESH (V-DMC) coding standard, these aspects can be applied to coding any dynamic mesh that maintains the same connectivity and the same number of vertices.

In Mammou, the coding of the mesh geometry is based on a surface subdivision scheme, that begins with a simple three-dimensional (3D) mesh called a base mesh. The base mesh contains a relatively small number of vertices and faces that are iteratively refined in a predictable manner. To that end, a subdivision process is used that adds new vertices and faces to the base mesh by iteratively subdividing the existing faces into smaller sub-faces. The new vertices are then displaced to new positions according to pre-defined rules, to gradually refine the mesh shape so as to obtain an increasingly smoother and/or more complex surface, as illustrated in FIG. 1.

Figure 1:
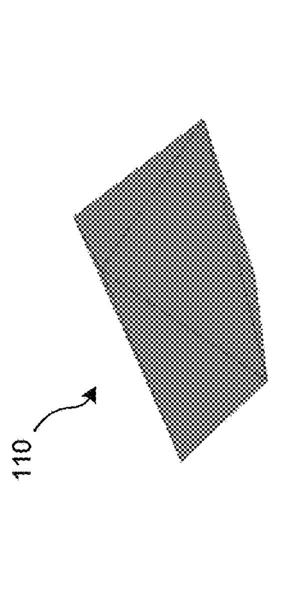
FIG. 1 illustrates surface refinement using an iterative subdivision process, according to aspects of the present disclosure.
Figure 1:
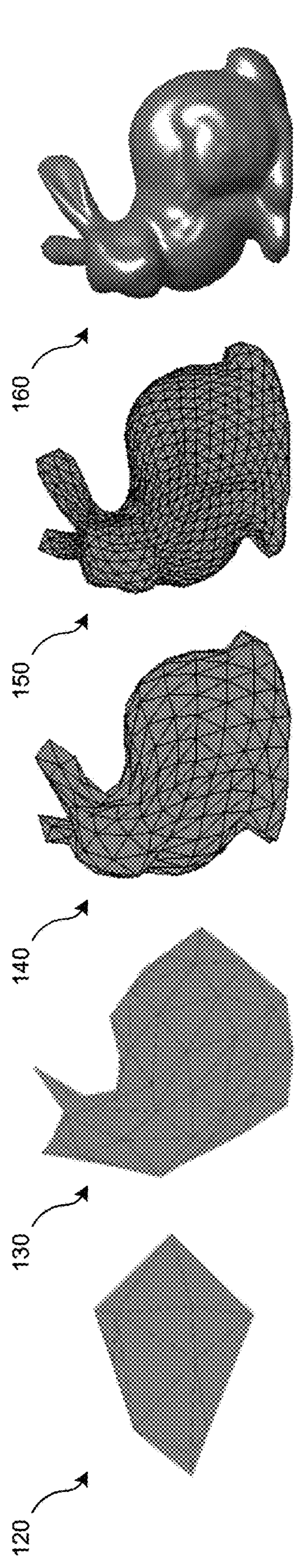
Figure 1:

FIG. 1 illustrates surface refinement using an iterative subdivision process 100. In the example of FIG. 1, an octahedron model 110, that is, a base mesh, is to be refined. Increasingly refined meshes (i.e., mesh subdivisions) 120-160 are produced, each one being a result of an iteration of subdivision of a previous mesh. The most refined mesh 160 is shown in FIG. 1 after applying a rendering operation (using, for example, an interpolated shading rendering method) to demonstrate the smoothness of the resulting mesh subdivision (the other 120-150 mesh subdivisions are shown in their faceted form).

Different surface subdivision schemes can be applied to the base mesh (e.g., 110). See, for example, A. Benton, "Advanced Graphics—Subdivision Surfaces," University of Cambridge. In Mammou, a simple mid-point subdivision scheme is used, as further described below. Since the connectivity of the base mesh can be refined in a predictable manner by using a set of subdivision rules known to both the encoder and the decoder, the only connectivity information that needs to be encoded and provided to the decoder is the connectivity of the base mesh. In addition to the base mesh connectivity, the base mesh geometry as well as displacement vectors have to be encoded and provided to the decoder, as further described below in reference to FIGS. 2-5 with respect to the dynamic mesh coding proposed in Mammou.

Generally, a mesh is a representation of a surface, including vertices that are associated with 3D locations on the surface; these vertices are connected by edges, forming planar faces (such as triangles) that approximate the surface. Other information may be associated with each of the mesh's vertices, namely, vertex attributes (e.g., a normal vector and a color value). In addition, the surface can be further represented by various attributes, such as texture. Typically, the surface's texture is described by a two-dimensional (2D) image, that is, a texture map. To associate the mesh's faces (e.g., triangles) with corresponding texture data, the mesh's faces are mapped into a 2D space (e.g., a UV parametric space) associated with a texture map. Similarly, the surface can be associated with other data types, provided by other attribute maps, characteristic of other physical properties of the surface (e.g., surface reflectance and transparency) that may be required for realistic rendering of the surface. Thus, surface representation by mesh data includes topological data and attribute data—the topology of a surface is represented by a mesh M (including geometry and connectivity information, and, possibly, vertex attributes) and the attributes of the surface represented by attribute maps A (including the attribute maps and respective mapping information). Aspects described herein with respect to textural data (represented by textural maps) are applicable to other types of data (generally represented by attribute maps).

Figure 2:
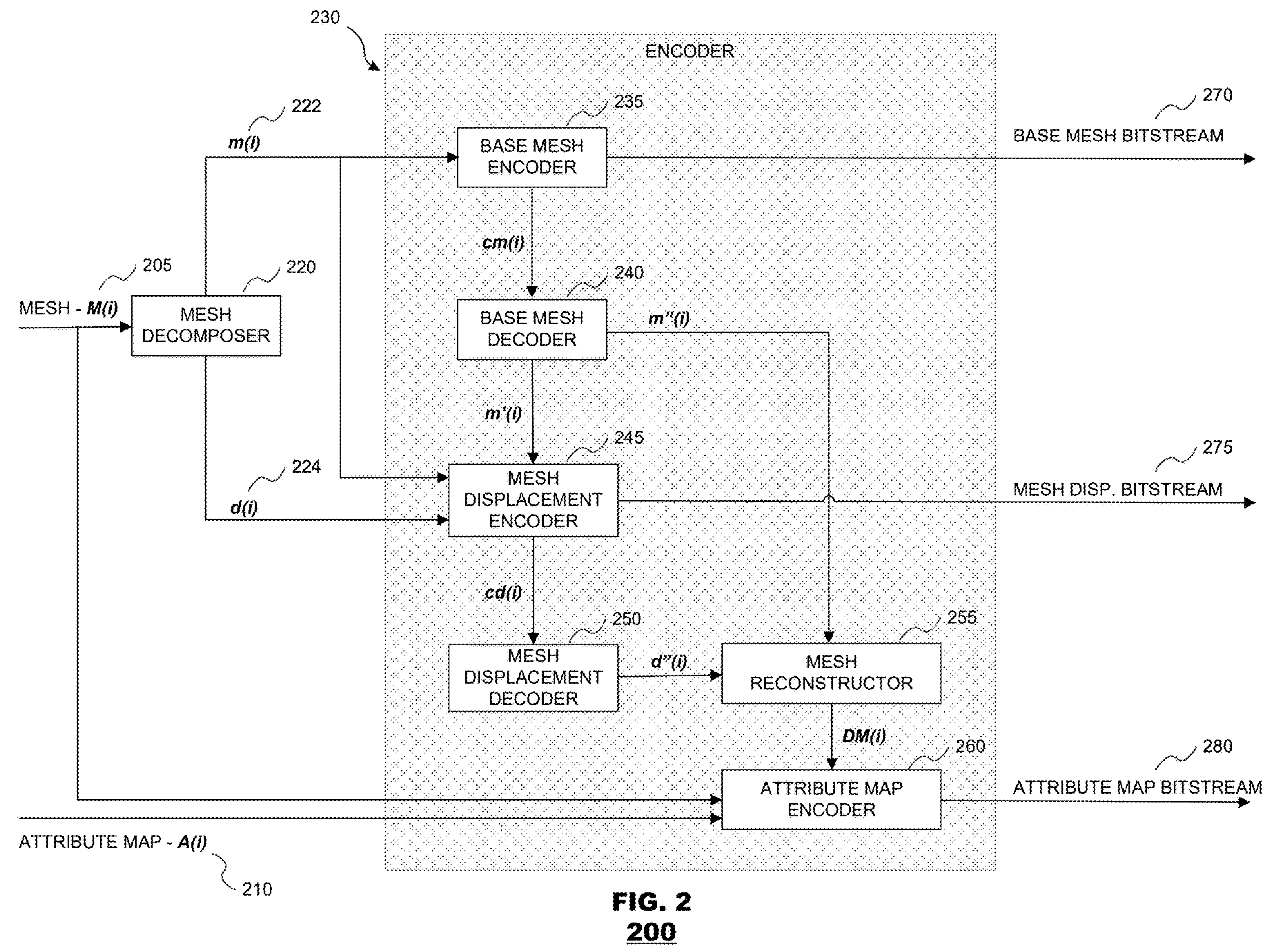
FIG. 2 is a functional block diagram of an example system for dynamic mesh encoding, according to aspects of the present disclosure.

FIG. 2 is a functional block diagram of an example system 200 for dynamic mesh encoding. The system 200 illustrates the encoding of a frame sequence F (i), where data associated with frame i include a mesh M (i) 205 and corresponding attribute map(s) A (i) 210. The system 200 includes a mesh decomposer 220 (e.g., a part of a pre-processing unit) and an encoder 230. The mesh decomposer 220 is configured to decompose a received mesh M (i) 205 into a base mesh m(i) 222 and corresponding displacement vectors d(i) 224. The generated base mesh m(i) 222 and displacement vectors d(i) 224, together with the corresponding attribute map(s) A(i) 210, are then fed into the encoder 230. The encoder 230 encodes the obtained data—m(i), d(i), and A(i)—generating therefrom respective bitstreams, including a base mesh bitstream 270, a mesh displacement bitstream 275, and an attribute map bitstream 280. The operation of the mesh decomposer 220 and the operation of the encoder 230 are further described below.

The decomposer 220 is configured to decompose a mesh M(i) 205 into a base mesh m(i) 222 and corresponding displacement vectors d(i) 224. To generate a base mesh m(i), the decomposer 220 decimates the mesh M(i) by subsampling the mesh's vertices (e.g., resulting in a base mesh 110 of FIG. 1). A mesh subdivision (e.g., 120) is then generated by subdividing the base mesh m(i), that is, each surface of the base mesh is subdivided into multiple subsurfaces, introducing additional new vertices. Any subdivision scheme may be applied, optionally, iteratively as demonstrated in FIG. 1. For example, each triangle of the base mesh surface can be split into four sub-triangles by introducing three new vertices in the middle of the triangle's edges and by connecting those three vertices.

Next, the decomposer 220 determines displacement vectors d(i) 224 for respective vertices of the subdivided base mesh, so that when applied to those vertices, a deformed mesh is generated that spatially fits the given mesh M(i) 205 to be encoded. Decomposing the given mesh M(i) in this manner—to allow encoding of the base mesh m(i) and its corresponding displacement vectors d(i) instead of directly encoding the mesh M(i)—improves compression efficiency. This is because the base mesh m(i) has fewer vertices relative to the mesh M(i), and, therefore, can be encoded by a relatively smaller number of bits. Furthermore, the displacement vectors d(i) can be efficiently encoded using, for example, a wavelet transform, enabled by the subdivision structure. In turn, the used subdivision structure need not be explicitly encoded as it can be determined by the decoder. For example, the decoder can subdivide the decoded base mesh based on a subdivision scheme type and a subdivision iteration count that can be signaled in the bitstream.

As illustrated in FIG. 2, the encoder 230 includes a base mesh encoder 235, a base mesh decoder 240, a mesh displacement encoder 245, a mesh displacement decoder 250, a mesh reconstructor 255, and an attribute map encoder 260. The base mesh encoder 235 is configured to encode the base mesh m(i) into coded base mesh cm(i) and to generate therefrom the base mesh bitstream 270. The base mesh decoder 240 is configured to reconstruct (decode) the base mesh from the coded base mesh cm(i), resulting in a reconstructed quantized base mesh m'(i) and a reconstructed base mesh m"(i). The base mesh encoder 235 and decoder 240 are further described in reference to FIG. 4 and FIG. 5, respectively. The mesh displacement encoder 245 receives as input the base mesh m(i) and the reconstructed quantized base mesh m'(i), based on which it is configured to encode the received displacement vectors d(i) into coded displacement vectors cd(i) and to generate therefrom the mesh displacement bitstream 275. The mesh displacement decoder 250 is configured to reconstruct (decode) the displacement vectors from the coded displacement vectors cd(i), resulting in reconstructed displacement vectors d"(i). Based on the reconstructed base mesh m"(i) and the reconstructed displacement vectors d"(i), the mesh reconstructor 255 is configured to reconstruct (decode) the mesh into reconstructed mesh DM(i). To that end, the reconstructed base mesh m"(i) is subdivided (according to the used subdivision scheme) and the reconstructed displacement vectors d"(i) are then applied to the subdivided base mesh, in effect deforming the subdivided base mesh to obtain DM(i). Based on the mesh M(i) and the reconstructed mesh DM(i), the attribute map encoder 260 is configured to encode the attribute map(s) A(i) 210 into coded attribute map(s) and to generate therefrom the attribute map bitstream 280.

Specifically, the mesh displacement encoder 245 encodes the displacement vectors d(i) that, as mentioned above, are associated with respective vertices of the subdivided base mesh. To that end, the displacement vectors are first updated based on the reconstructed quantized base mesh m'(i). Then, a wavelet transform is applied to represent the updated displacement vectors d'(i) according to the used subdivision scheme—that is, wavelet coefficients are extracted according to the subdivision process with which the base mesh has been subdivided. These wavelet coefficients are then quantized, packed into a 2D image, and compressed by a video encoder. The mesh displacement decoder 250 generally reverses the operation of the mesh displacement encoder 245. Accordingly, the mesh displacement decoder 250 employs a video decoder to decode the packed 2D image compressed by the video encoder of the mesh displacement encoder 245 (if the video encoder is lossy). Then, the mesh displacement decoder 250 unpacks the 2D image to obtain the quantized wavelet coefficients and applies inverse quantization followed by an inverse wavelet transform, generating the reconstructed displacement vectors d"(i).

Note that a video encoder is applied to the task of compressing the packed wavelet coefficients (by the mesh displacement encoder 245) and to the task of compressing the attribute map(s) (by the attribute map encoder 260). Any video encoding method (either lossless or lossy) may be employed for these tasks, in accordance with a specific application's requirements.

Figure 3:
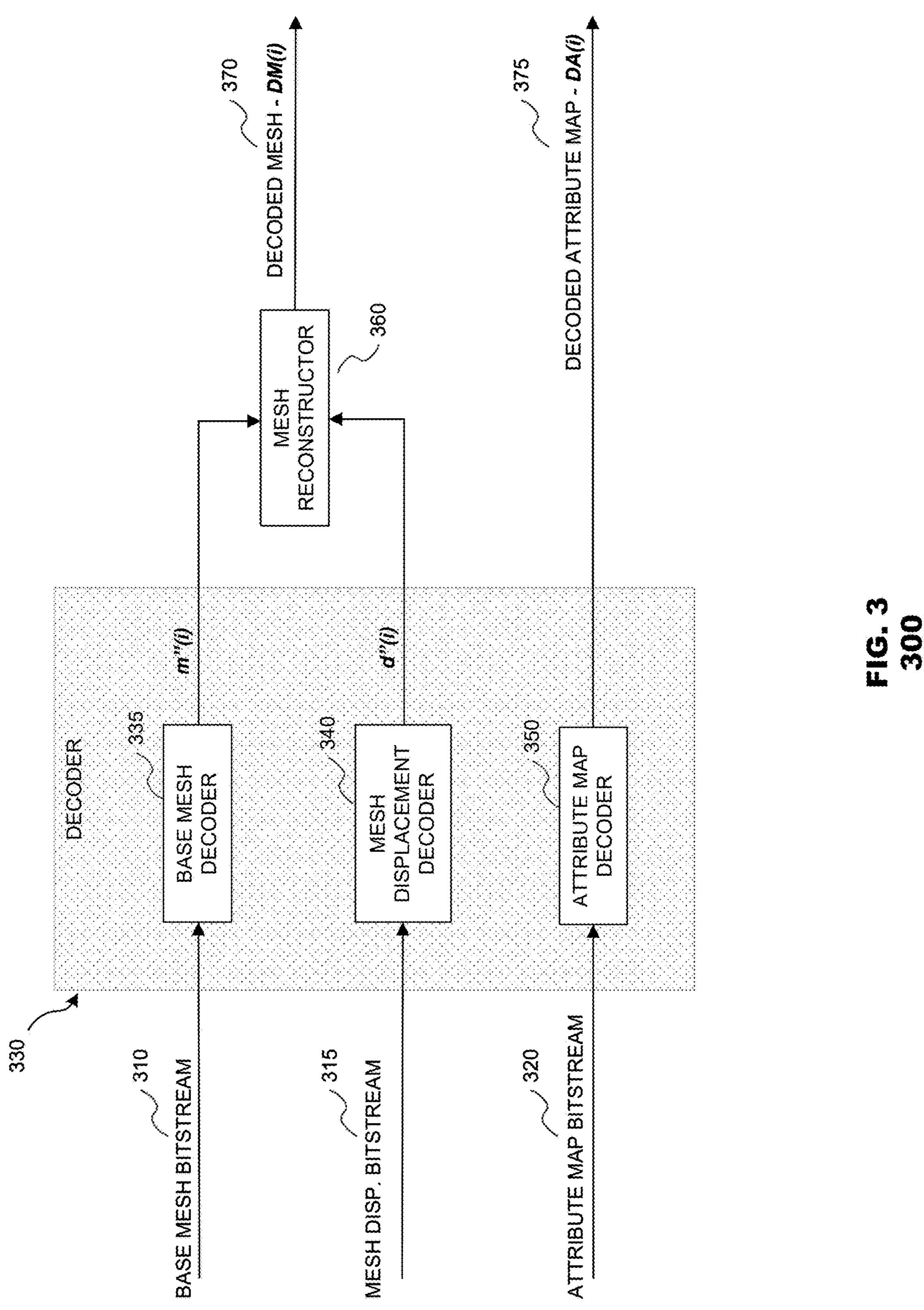
FIG. 3 is a functional block diagram of an example system for dynamic mesh decoding, according to aspects of the present disclosure.

FIG. 3 is a functional block diagram of an example system 300 for dynamic mesh decoding. The system 300 is configured to generally reverse the operation of system 200, including a decoder 330 and a mesh reconstructor 360. The decoder 330 includes a base mesh decoder 335, a mesh displacement decoder 340, and an attribute map decoder 350. The base mesh decoder 335 decodes the reconstructed base mesh m"(i) out of the base mesh bitstream 310, 270, as further described in reference to FIG. 5. The mesh displacement decoder 340 decodes the reconstructed displacement vectors d"(i) out of the mesh displacement bitstream 315, 275, performing the steps described in reference to the mesh displacement decoder 250 of FIG. 2. The attribute map decoder 350 decodes the attribute map out of the attribute map bitstream 320, 280, reversing the operation of the attribute map encoder 260 to generate the reconstructed attribute map DA(i) 375. The decoder's 330 outputs—the reconstructed base mesh m"(i) and the reconstructed displacement vectors d"(i)—are used by the mesh reconstructor 360 to reconstruct the decoded mesh DM(i) 370.

Figures 4, 5:
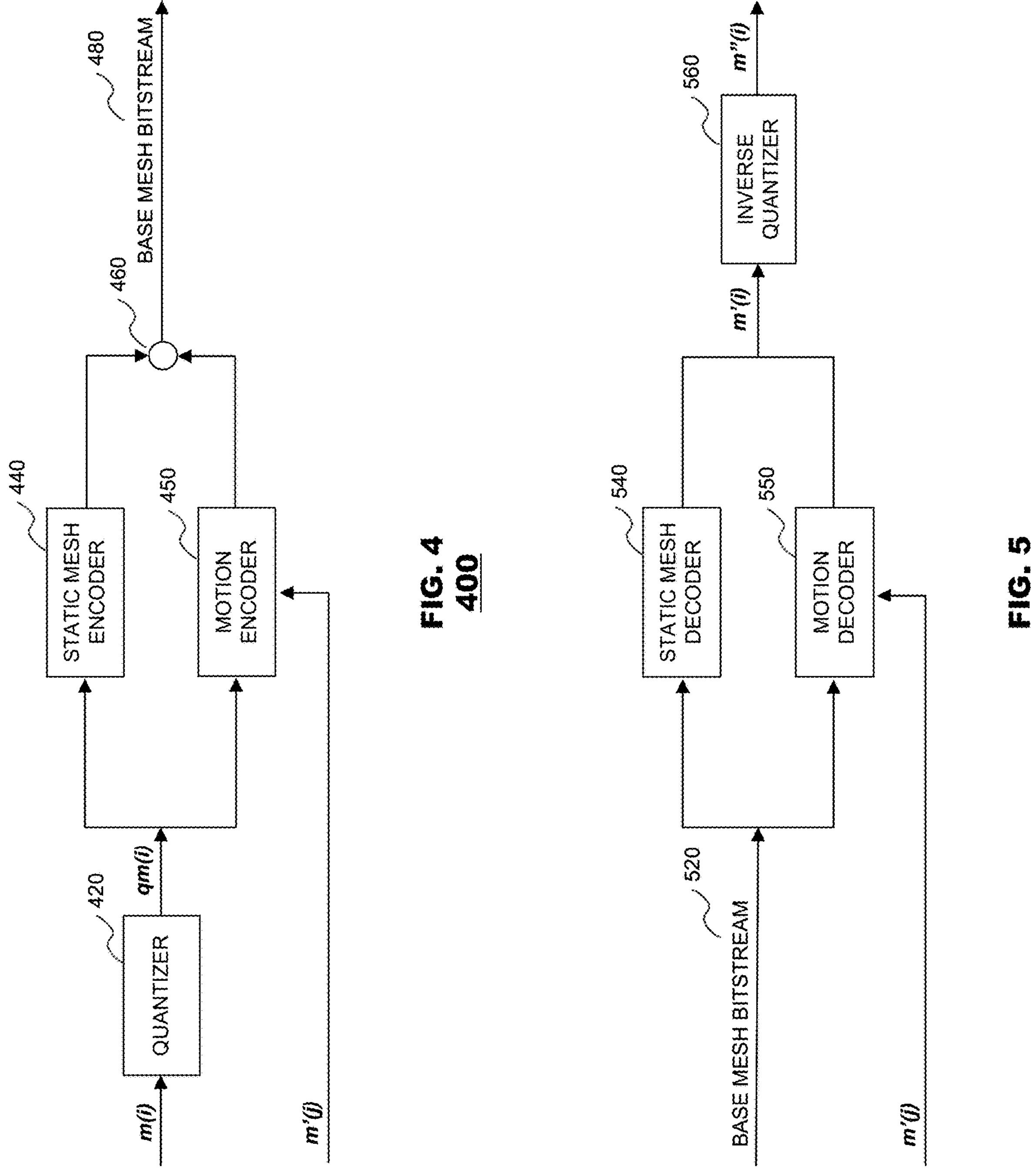
FIG. 4 is a functional block diagram of an example base mesh encoder, according to aspects of the present disclosure.
FIG. 5 is a functional block diagram of an example base mesh decoder, according to aspects of the present disclosure.

FIG. 4 is a functional block diagram of an example base mesh encoder 400. The base mesh encoder 400 includes a quantizer 420, a static mesh encoder 440, a motion encoder 450, and a selector 460. As described above in reference to the base mesh encoder 235 of FIG. 2, the base mesh encoder 400 is configured to encode a base mesh m(i) into a base mesh bitstream 480. To that end, two encoders 440, 450 may be employed. Accordingly, following quantization 420, the static mesh encoder 440 encodes the quantized base mesh qm(i) according to any static mesh encoding method. Additionally, following quantization 420, the motion encoder 450 encodes the quantized base mesh qm(i) relative to a reference base mesh, that is, a reconstructed quantized base mesh, denoted m'(j). For example, the reference base mesh, m'(j), may be associated with a previous reconstructed quantized base mesh m'(i−1) of the frame sequence F(i). Thus, the motion encoder 450 encodes a motion field f(i) that describes the motion that vertices of m'(j) have to undergo in order to reach respective locations of corresponding vertices of qm(i) (or vice versa), as further described below.

Hence, when employing the motion encoder 450, it is assumed that the base mesh and the reference base mesh share the same number of vertices and the same vertex connectivity—that is, only the locations of corresponding vertices change over time. To maintain the same number of vertices and the same vertex connectivity in base meshes of the frame sequence, the encoder 400, for example, can keep track of the transformation applied to the geometry of a previous base mesh and apply the same to a current base mesh. Under such conditions, the motion encoder 450 can be configured to first compute a motion field f(i), and, then, to encode the computed motion field into the base mesh bitstream 480. The motion field f(i) contains motion vectors respective of corresponding vertices in the quantized base mesh qm(i) and the reference reconstructed quantized m'(j), as follows:

$$f(i) = P_1(i) - P_2(j), \tag{1}$$

where $P_1(i)$ is a vector containing geometry data (vertex positions) of the quantized base mesh qm(i) and where $P_2(j)$ is a vector containing geometry data (corresponding vertex positions) of a reference reconstructed quantized base mesh m'(j). In an aspect, the motion encoder 350 may further adjust the motion vectors (e.g., based on neighboring motion vectors) and then encode the adjusted motion vectors using an entropy coder, for example.

The choice whether to use the output of the static mesh encoder 440 or the output of the motion encoder 450 can be carried out by the selector 460. In Mammou, it is proposed to select the bitstream of the encoder (440 or 450) that results in the least geometric distortion. A preferred approach is to consider the overall rate-distortion cost introduced by the dynamic mesh encoding (via encoder 230) when selecting between the output of the static mesh encoder 440 and the output of the motion encoder 450. Accordingly, rate-distortion optimization that accounts for topological and photometric distortions as well as bitrate levels can be performed. Such rate-distortion optimization can lead to a selection of the encoder (440 or 450) that will provide more efficient coding, corresponding to optimal rate-distortion cost, as disclosed in application no. EP22306231.6, titled Rate Distortion Optimization for Time Varying Textured Mesh Compression, the disclosure of which is incorporated by reference herein in its entirety.

FIG. 5 is a functional block diagram of an example base mesh decoder 500. The base mesh decoder 500 generally reverses the operation of the base mesh encoder 400. It 500 includes a static mesh decoder 540, a motion decoder 550 and an inverse quantizer 560. As described above in reference to the base mesh decoder 335 of FIG. 3, the base mesh decoder 500 is configured to decode the reconstructed base mesh m"(i) out of the base mesh bitstream 520, 480. To that end, the base mesh decoder 500 directs an incoming base mesh stream 520 (representing a coded base mesh cm(i)) either to the static mesh decoder 540 or to the motion decoder 550. Such direction can be made based on signaling in the bitstream 520 indicative of whether the coded base mesh cm(i) was encoded by the static mesh encoder 440 or the motion encoder 450. If the bitstream 520 is directed to the static mesh decoder 540, this decoder decodes the base mesh from the bitstream 520, resulting in the reconstructed quantized base mesh m'(i). Otherwise, if the bitstream 520 is directed to the motion decoder 550, this decoder decodes the motion field from the bitstream 520 and adds the reconstructed (decoded) motion field to the reference reconstructed quantized base mesh m'(j), resulting in the reconstructed quantized base mesh m'(i). The resulting m'(i) is then provided to the inverse quantizer 560 that generates therefrom the reconstructed base mesh m"(i). As described above, the base mesh decoder 500 is also employed in the encoder 230, where it 240 provides the reconstructed quantized base mesh m'(i) and the reconstructed base mesh m"(i) to the mesh displacement encoder 245 and the mesh reconstructor 255, respectively.

Aspects of the present disclosure describe alternative techniques to compute and encode the motion filed f(i) (i.e., motion vectors), applying a Graph Fourier Transform (GFT). See, A. Ortega, P. Frossard, J. Kovaĉević, J. M. F. Moura and P. Vandergheynst, "Graph signal processing: Overview, challenges, and applications," Proceedings of the IEEE, vol. 106, no. 5, pp. 808-828, 2018. The GFT is an extension of the classic Fourier Transform to a more general domain: data residing on irregular graphs. 3D mesh models are one example of such data. "Irregular" in this context means that each vertex in a mesh can be connected to a variable number of other vertices, such that the network of vertex connections across the mesh is irregular. Such a network can be described by a planar graph, denoted G=(V, E), where V denotes the set of mesh vertices (graph nodes) and E denotes the set of mesh edges (connections between the vertices).

Figure 6:
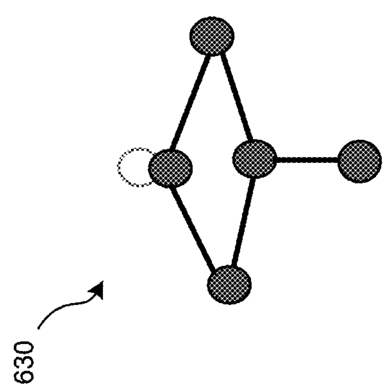
FIG. 6 illustrates different types of graphs, according to aspects of the present disclosure.
Figure 6:
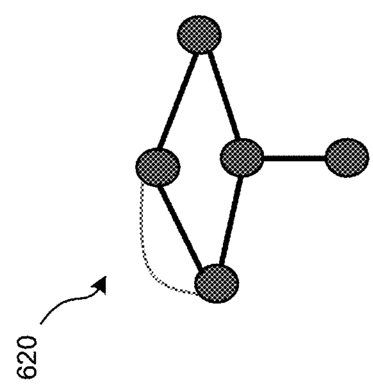
Figure 6:
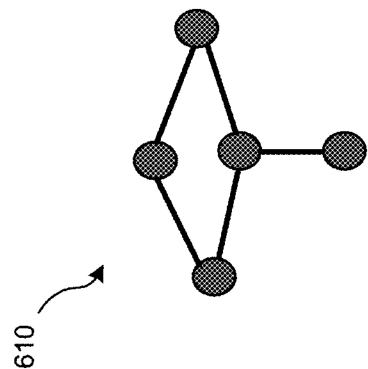
Figure 6:

FIG. 6 illustrates different types of graphs. In practice, aspects disclosed herein are typically applied to a graph 610 with simple connectivity ("simple" graph). A simple graph is a graph for which: 1) the links between the different nodes are undirected (that is, the edges have no direction); 2) there are no multiple links between any pair of nodes (that is, there cannot be more than one edge connecting any pair of vertices as demonstrated by graph 620); 3) there are no loops around any node (that is, each edge connects two different vertices, not any one vertex to itself as demonstrated by graph 630); and 4) the graph links are unweighted (that is, the edges have no weights associated with them as they are all considered equally important, which is equivalent to giving a weight of 1 to each edge).

Karni et al. showed how the GFT could be used to obtain "spectral compression" of 3D mesh geometry. See, Z. Karni and C. Gotsman, "Spectral compression of mesh geometry," in SIGGRAPH'00, New Orleans, Louisiana, USA, 2000 ("Karni"). In Karni, it is assumed that the vertex location vectors of the mesh (considering separately the x, y, and z coordinates) may be expressed as a linear combination of a small number of orthogonal basis vectors. Such orthogonal basis vectors can be obtained from the combinatorial mesh Laplacian matrix. This is similar in principle to the transform coding technique used in the JPEG image compression standard, which is based on using discrete cosine transform (DCT) basis vectors to obtain more compact representations of the image's pixel data.

The computation of the combinatorial mesh Laplacian matrix, L, depends only on the mesh (graph) connectivity. For a mesh with n vertices, L is a square n×n matrix that is computed as:

$$L = D - A, \tag{2}$$

where A is a symmetric "adjacency matrix" of n×n dimensions. Matrix elements of A, at locations (i,j) and (j,i), have a value "1" if vertex i (i.e., $v_i$) is connected by an edge to vertex j (i.e., $v_j$) and a value "0" otherwise. D is a "degree matrix" of n×n dimension that contains, on the main diagonal, the sum of the adjacency matrix values across the corresponding row (or column), and zeros in all the other locations. The value of a diagonal element i in D (that is, element D(i,i)) is considered as the degree or the valence of vertex i, denoted deg ($v_i$), which represents the number of edges connected to that vertex. The formal mathematical definition for L can be written as:

$$(L_{i,j}) := \begin{cases} deg(v_i) & \text{if } i = j \\ -1 & \text{if } i \neq j \text{ and } v_i \text{ is adjacent to } v_j \\ 0 & \text{otherwise} \end{cases} \tag{3}$$

To obtain the basis vectors, the eigenvectors (n×1 column vectors) and the eigenvalues (n scalar) of the matrix L are computed. The eigenvalues are then sorted in ascending order by their magnitude, and their corresponding eigenvectors are ordered accordingly. The normalized version of the ordered eigenvectors of the Laplacian matrix L, namely, Laplacian eigenvectors, constitute orthonormal basis vectors and are denoted herein by $L_{eigenvectors}$.

Taubin showed that the Laplacian eigenvectors, when computed based on connectivity information of a mesh, form an orthogonal basis for the vector space $\mathbb{R}^n$ (where n is the number of vertices of the mesh) and thus such orthogonal basis can be used to represent the mesh geometry data. See, G. Taubin, "A Signal Processing Approach to Fair Surface Design," in SIGGRAPH'95, Los Angeles, California, USA, 1995. Representing the mesh geometry data by the Laplacian eigenvectors may be analogized with the representation provided by Fourier basis vectors, where respective eigenvalues can be analogized with respective frequencies associated with the Fourier basis vectors. Therefore, the arrangement of eigenvalues from lowest to highest magnitude, and the arrangement of their corresponding eigenvectors in the same order, effectively puts all the "lowest-frequency" basis vectors first, followed by increasingly "higher-frequency" basis vectors. Thus, eigenvectors that correspond to eigenvalues of zero can be considered as "DC" components (using the above analogy).

As demonstrated in Karni, each dimension of the mesh's geometry data—that is, each of the vertex location vectors $X=\{x_1, x_2, \ldots, x_n\}$, $Y=\{y_1, y_2, \ldots, y_n\}$, $Z=\{z_1, z_2, \ldots, z_n\}$—can be projected onto the same set of Laplacian eigenvectors (basis vectors) by a matrix multiplication to obtain 3 sets of spectral coefficients (namely, GFT coefficients), each of which is a vector of size 1×n. For example, with respect to X and the corresponding set of spectral coefficients, each coefficient in the set indicates "how much" of the corresponding basis vector (eigenvector) is required to represent X as a linear combination of all the eigenvectors.

When encoding the GFT coefficients, since the coefficients are usually quantized prior to entropy coding, there will be some irreversible loss, resulting in lossy reconstruction (decoding) of the mesh geometry data. Nevertheless, the key strength of this transform coding method is that, for relatively smooth meshes, the resulting coefficients will have large magnitudes only for those corresponding to lower-frequency basis vectors, while the other coefficients will have values of zero or close to zero. Therefore, a good approximation of the original mesh can be obtained by coding only a portion of the coefficients (those corresponding to lower-frequency basis vectors). Additionally, coding and transmitting (a portion or all of) the coefficients can be done so that a decoder can progressively improve the reconstructed mesh based on coefficients received so far. Thus, a graceful progressive reconstruction of the mesh geometry data (shape) is enabled at different quality levels (i.e., different levels of accuracy of the reconstruction of the mesh's vertex location vectors X, Y, and Z). As the mesh connectivity (based on which the Laplacian eigenvectors are derived) remains unchanged, the only information that has to be encoded across the frame sequence is changes in the base mesh geometry (that is, changes in vertex location vectors X, Y, and Z).

Hence, since the computation of the Laplacian eigenvectors (that is, matrix $L_{eigenvectors}$) is independent of the mesh geometry, these eigenvectors can be computed independently at the decoder end based on the mesh's connectivity data. The mesh's connectivity data, in turn, can be provided to the decoder in the same bitstream that represents the geometry of base meshes in the sequence F(i) (e.g., bitstream 480) or, otherwise, independently provided to the decoder from another source. No indices have to be provided to the decoder for the ordering of the eigenvectors since the decoder can sort the eigenvalues and order the eigenvectors accordingly in the same manner that it has been done by the encoder. Note also that since the Laplacian eigenvectors are orthonormal and contain real values (no complex numbers), $L_{eigenvectors}$ can be inverted by simply transposing it, that is, $L_{eigenvectors}^{-1}=L_{eigenvectors}^{T}$.

The main known limitation of applying the GFT to represent a mesh geometry (or other data associated with a mesh's vertices) is that it requires the computation of the eigenvectors of the Laplacian matrix at both the encoder and the decoder ends. Performing such computations for very large meshes (e.g., beyond several thousand vertices) can be both time-consuming and susceptible to numerical instabilities that can lead to unexpected results. However, such limitations are not present when applying the GFT to small meshes such as the base meshes, as described herein.

In a first approach disclosed herein, the GFT is derived based on intra-frame mesh connectivity. In this approach, motion vectors are represented explicitly in the GFT domain. Accordingly, a motion vector associated with a vertex from a mesh (e.g., a base mesh) can be represented by the difference between the GFT coefficients of the vertex and the GFT coefficients of a corresponding vertex from another mesh (e.g., a reference base mesh). In a second approach disclosed herein, the GFT is derived based on inter-frame mesh connectivity. In this approach, the motion vectors are implicitly represented by inter-frame graphs. That is, linear graphs (each connecting corresponding vertices across a mesh sequence) can be constructed, and, then, these linear graphs can each be transformed to the GFT domain. Thus, the motion vectors are implicitly represented through the representation of the changing geometry of the mesh sequence in the GFT domain. In both approaches, depending on the required mesh reconstruction quality level, a subset of the computed GFT coefficients can be selected to be encoded (e.g., by the motion encoder 450) and/or decoded (e.g., by the motion decoder 550) to facilitate progressive representation.

In Thanou et al. the GFT is applied to encode motion vectors of dynamic point clouds. See, D. Thanou, P. A. Chou and P. Frossard, "Graph-based compression of dynamic 3D point cloud sequences," IEEE Transactions on Image Processing, vol. 25, no. 4, pp. 1765-1778, 2016. Therein, the GFT is applied to the motion vectors that are first explicitly computed between different frames of the sequence. However, aspects disclosed herein apply the GFT directly to the vertex x, y, z positions of meshes across different frames, and so the motion vectors do not need to be directly computed because their representation is in the GFT domain. Moreover, in Thanou, since the GFT is applied to dynamic point clouds (not dynamic meshes), an octree data structure has to be constructed to spatially organize the input point cloud data and to compute graphs on those data. No additional data structures are required herein to apply the GFT to the geometry of the meshes. Additionally, the motion estimation problem in Thanou is formulated as a feature matching problem on dynamic graphs, where the features are the wavelet coefficients computed from spectral graph wavelets (SGWs) at each node of the graph, at different scales. See, D. K. Hammond, P. Vandergheynst and R. Gribonval, Wavelets on graphs via spectral graph theory, Applied and Computational Harmonic Analysis, vol. 30, no. 2, pp. 129-150, 2011. These feature descriptors are then used to compute point-to-point correspondences between graphs of different frames. In contrast, no per-point feature matching is required by aspects described herein.

Aspects of the first approach mentioned above (where the GFT is derived based on intra-frame mesh connectivity) are described next in reference to encoding steps C1.1-C1.10 and decoding steps D1.1-D1.6. These steps are described in reference to 1) base meshes of respective frames in a sequence; 2) a reconstructed quantized reference base mesh m'(j) (that may be the first base mesh in the frame sequence or the first base mesh in a group of frames (GOF)); and 3) a base mesh m(i) (that may be the next base mesh in the sequence or the next base mesh in the GOF). Note that these steps are generally applicable to a reference mesh and to a mesh in a mesh sequence that maintains the same connectivity and the same number of mesh vertices.

Accordingly, steps C1.1-C1.10 can be performed to encode motion data by the motion encoder 450, as follows.

Step C1.1: compute the Laplacian matrix, L, based on intra-frame mesh connectivity. The mesh connectivity can be derived from the first mesh in the sequence (e.g., m'(j)). Then, compute the eigenvectors and eigenvalues of L, order the eigenvectors based on the order of the sorted eigenvalues, and normalize the ordered eigenvectors to obtain the orthonormal basis vectors $L_{eigenvectors}$.

Step C1.2: project the geometry data associated with vertices of m'(j)—that is, $X_{m'(j)}=\{x_1, x_2, \ldots, x_n\}$, $Y_{m'(j)}=\{y_1, y_2, \ldots, y_n\}$, and $Z_{m'(j)}=\{z_1, z_2, \ldots, z_n\}$—onto $L_{eigenvectors}$ to obtain the GFT coefficients ($CX_{m'(j)}$, $CY_{m'(j)}$, $CZ_{m'(j)}$), as follows:

$$\begin{aligned} CX_{m'(j)} &= X_{m'(j)} \times L_{eigenvectors} \\ CY_{m'(j)} &= Y_{m'(j)} \times L_{eigenvectors}, \\ CZ_{m'(j)} &= Z_{m'(j)} \times L_{eigenvectors} \end{aligned} \tag{4}$$

where operator × indicates matrix multiplication, $L_{eigenvectors}$ is an n×n matrix where each column represents one eigenvector (basis vector), and the GFT coefficients in $CX_{m'(j)}$, $CY_{m'(j)}$, and $CZ_{m'(j)}$ are each a vector of size 1×n.

Step C1.3: repeat step C1.2 for the geometry data associated with vertices of the base mesh m(i), whose motion data are to be computed with respect to m'(j), to obtain the GFT coefficients, $CX_{m(i)}$, $CY_{m(i)}$, and $CZ_{m(i)}$.

Step C1.4: select a subset of the GFT coefficients to be encoded and thus to be available for the decoder for signal reconstruction. The most significant (largest-magnitude) coefficients will usually be first in the 1×n vectors of the coefficients, as these correspond to the lowest frequencies. The more coefficients are kept, the more accurate will be the final reconstruction of the base meshes' vertex positions. The same coefficients (i.e., coefficients corresponding to the same eigenvector indices) must be kept for the x, y, and z coefficient vectors. In the simplest case, the same cut-off can be used for all the coefficient vectors, for all the base meshes—for example, 50% of the lowest-frequency coefficients can be kept and the rest are set to 0. If the coefficients are discarded in a linear manner (i.e., in order and not by non-linear indexing into the coefficient arrays), there is no need to provide the decoder with information regarding the eigenvector indices of which coefficients were kept. Alternatively, instead of selecting a subset of the spectral coefficients, the encoder can progressively provide the decoder with all the coefficients and the decoder can decide when to stop the decoding process, for example, when the already reconstructed signal reaches a sufficient quality level or when a bitrate limit has been reached at the decoder system.

Step C1.5: quantize the (selected) GFT coefficients of m'(j) (according to a quantization method of choice). The quantized coefficients, denoted $CX'_{m'(j)}$, $CY'_{m'(j)}$, and $CZ'_{m'(j)}$, are then entropy-encoded and transmitted to the decoder.

Step C1.6: dequantize the (selected), GWT coefficients of m'(j). The dequantized GFT coefficients of m'(j) are denoted $\widehat{CX}_{m'(j)}$, $\widehat{CY}_{m'(j)}$, and $\widehat{CZ}_{m'(j)}$. Steps C1.5 and C1.6 are carried out to avoid the building up of quantization error across the frames as successive motion vectors are computed.

Step C1.7: compute the differences in the (selected) GFT coefficients, for the x, y, and z components, as follows:

$$MV_{m'(j),m(i)} = \begin{bmatrix} CX_{m(i)} \\ CY_{m(i)} \\ CZ_{m(i)} \end{bmatrix} - \begin{bmatrix} \widehat{CX}_{m'(j)} \\ \widehat{CY}_{m'(j)} \\ \widehat{CZ}_{m'(j)} \end{bmatrix} \tag{5}$$

where the matrix $MV_{m'(j),m(i)}$ represents the motion vectors between base meshes m'(j) and m(i) in the GFT domain. The motion matrix, $MV_{m'(j),m(i)}$, is a matrix of size 3×n.

Step C1.8: quantize the values in the motion matrix $MV_{m'(j),m(i)}$ (according to a quantization method of choice). The quantized motion matrix is denoted $MV'_{m'(j),m(i)}$.

Step C1.9: entropy-code the quantized motion matrix and transmit it to the decoder. In an aspect, any entropy-coding method can be applied, independently or collectively, to the different frequency bands (of respective eigenvalues).

Step C1.10: repeat steps C1.2-C1.9 (except for steps C1.5 and C1.6, since only the coefficients of the first reference base mesh are quantized and sent to the decoder) for each subsequent base mesh in the sequence (or in the same GOF), with the reference base mesh at each iteration being, for example, the reconstructed base mesh m'(i) from the previous iteration. Note that the choice of the reference base mesh at each iteration is not limited, although it might be beneficial to update the reference mesh at each iteration so as to improve the chances of having smaller motion vectors than if the motion is measured with respect to a reference mesh that is located several frames before the frame of the base mesh.

The coded motion data can be decoded by the motion decoder 550, generally reversing the above motion coding steps C1.1-C1.10, as described in steps D1.1-D1.6 below.

Step D1.1: compute the Laplacian matrix, L, based on intra-frame mesh connectivity. The mesh connectivity can be derived from the decoded version of m'(j). Then, compute the eigenvectors and eigenvalues of L, order the eigenvectors based on the order of the sorted eigenvalues, and normalize the ordered eigenvectors to obtain the orthonormal basis vectors $L_{eigenvectors}$.

Step D1.2: entropy-decode and dequantize the GFT coefficients of m'(j) (received by step C1.5). These dequantized coefficients are denoted $\widehat{\mathbf{CX}}_{m'(j)}$, $\widehat{\mathbf{CY}}_{m'(j)}$, and $\widehat{\mathbf{CZ}}_{m'(j)}$.

Step D1.3: entropy-decode and dequantize the motion vectors $MV_{m'(j),m(i)}$ (received by step C1.9). These dequantized motion vectors are denoted $\widehat{\mathbf{MV}}_{m'(j),m(i)}$.

Step D1.4: add the dequantized motion vectors $\widehat{\mathbf{MV}}_{m'(j),m(i)}$ to the dequantized coefficients $\widehat{\mathbf{CX}}_{m'(j)}$, $\widehat{\mathbf{CY}}_{m'(j)}$, and $\widehat{\mathbf{CZ}}_{m'(j)}$ to reconstruct the GFT coefficients of m(i) (reversing the encoder's operation in step C1.7):

$$\begin{bmatrix} \widehat{\mathbf{CX}}_{m(i)} \\ \widehat{\mathbf{CY}}_{m(i)} \\ \widehat{\mathbf{CZ}}_{m(i)} \end{bmatrix} = \begin{bmatrix} \widehat{\mathbf{CX}}_{m'(j)} \\ \widehat{\mathbf{CY}}_{m'(j)} \\ \widehat{\mathbf{CZ}}_{m'(j)} \end{bmatrix} + \hat{M}V_{m'(j),m(i)}, \tag{7}$$

Step D1.5: reconstruct the (x, y, z) vertex position values of m(i) by linearly combining its reconstructed coefficients $\widehat{\mathbf{CX}}_{m'(i)}$, $\widehat{\mathbf{CY}}_{m'(i)}$, $\widehat{\mathbf{CZ}}_{m(i)}$ with corresponding Laplacian eigenvectors in ${L_{eigenvectors}}^T$ as follows:

$$\begin{aligned} \hat{X}_{m(i)} &= \widehat{\mathbf{CX}}_{m(i)} \times L^T_{eigenvectors} \\ \hat{Y}_{m(i)} &= \widehat{\mathbf{CZ}}_{m(i)} \times L^T_{eigenvectors}, \\ \hat{Z}_{m(i)} &= \widehat{\mathbf{CZ}}_{m(i)} \times L^T_{eigenvectors} \end{aligned} \tag{8}$$

where operator × indicates matrix multiplication and where operator T indicates matrix transpose. Similarly, the (x, y, z) vertex position values of the reference base mesh m'(j)—that is, $\hat{X}_{m'(j)}$, $\hat{Y}_{m'(j)}$, and $\hat{Z}_{m'(j)}$—may be reconstructed based on $\widehat{\mathbf{CX}}_{m'(j)}$, $\widehat{\mathbf{CY}}_{m'(j)}$, and $\widehat{\mathbf{CZ}}_{m'(j)}$.

Step D1.6: repeat steps D1.3-D1.5 for each successive base mesh in the sequence (or in the same GOF), iteratively updating the reference base mesh as necessary (this depends on how the reference base meshes were chosen at the encoder). The motion vectors can be obtained from geometry data of corresponding vertices of a base mesh and a reference base mesh. In this case, for example, motion vectors can be obtained from corresponding vertices in $\hat{X}_{m(i)}$, $\hat{Y}_{m(i)}$, $\hat{Z}_{m(i)}$ and in $\hat{X}_{m'(j)}$, $\hat{Y}_{m'(j)}$, $\hat{Z}_{m'(j)}$.

Figure 7:
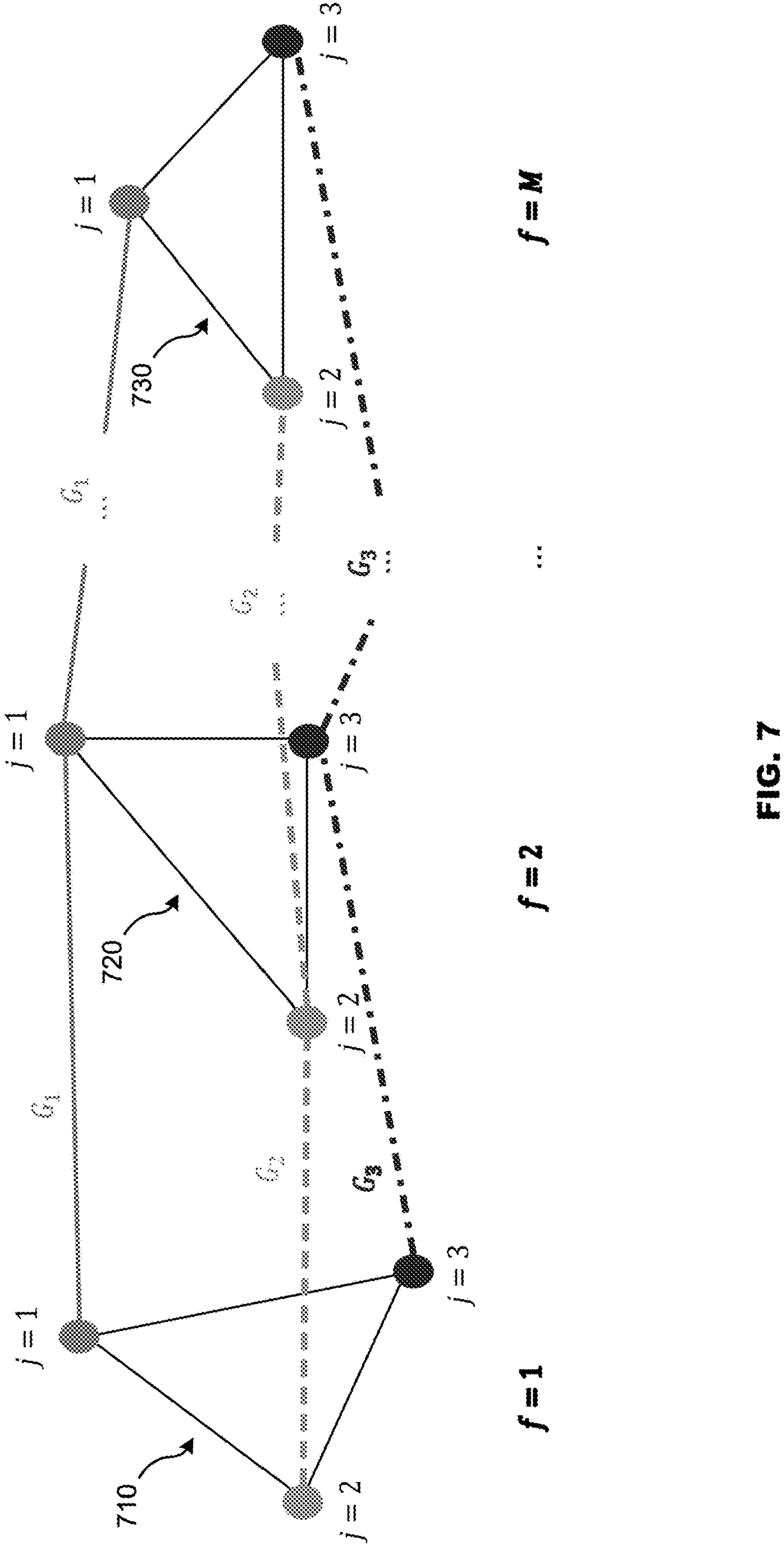
FIG. 7 illustrates inter-frame graph construction, according to aspects of the present disclosure.

Aspects of the second approach mentioned above (where the GFT is derived based on inter-frame mesh connectivity) are described next in reference to encoding steps C2.1-C2.8 and decoding steps D2.1-2.5. In this case, inter-frame graphs can be used to implicitly represent the motion vectors. An example for constructing inter-frame graphs is shown in FIG. 7. In the example of FIG. 7, a dynamic mesh sequence 710, 720, 730 is shown, where each base mesh includes n=3 vertices. The base meshes across the frame sequence maintain the same connectivity, as only their vertex positions, indexed by j={1,2,3}, change across the frames. The mesh sequence 710, 720, 730 spans M frames, indexed by f={1,2, . . . , M}. Three inter-frame graphs are shown—$G_1$, $G_2$, and $G_3$—each of which connects corresponding vertices across the M frames. Thus, per each vertex j, an inter-frame graph $G_j$ is constructed across the mesh sequence 710, 720, 730, having M nodes (one per frame), as demonstrated in FIG. 7. Note that the M frames may be frames from the entire frame sequence or may be frames of a GOF (in a case where each GOF is processed separately).

Since the inter-frame graph $G_j$ is linear (that is, vertices of the first base mesh in the sequence are connected only to corresponding vertices of the second base mesh in the sequence, which, in turn, are connected only to corresponding vertices of the third base mesh in the sequence, etc.) the only information that is needed (at both the encoder end and the decoder end) to construct the graph is the number of vertices in the base mesh and the number of frames in the sequence (or the GOF) that need to be connected together. Note also that because the inter-frame graph construction is independent of the input mesh geometry or connectivity, the eigenvectors and eigenvalues in $L_{eigenvectors}$ could be pre-computed by both the encoder and decoder and reused for mesh sequences (or GOF) with the same number of frames in the sequence (or in the GOF) and the same number of mesh vertices (e.g., the same number of vertices in each base mesh).

Steps C2.1-C2.8 below can be performed to encode motion data by the motion encoder 450, using implicit motion data representation. Steps C2.1-C2.8 are applicable to a mesh sequence that maintains the same connectivity and the same number of mesh vertices.

Step C2.1: construct inter-frame graphs, $G_j$, j={1,2, . . . , n}, across M frames of a mesh sequence, by connecting corresponding vertices $v_j$ across the M frames, as demonstrated in reference to FIG. 7. Then, perform the following steps with respect to each graph, $G_j$, j={1,2, . . . , n}.

Step C2.2: compute an M×M adjacency matrix $A_j$, an M×M degree matrix $D_j$, and an M×M combinatorial Laplacian matrix $L_j=D_j—A_j$, based on the connectivity of $G_j$, as explained in reference to equations (2) and (3).

Step C2.3: compute and sort the Laplacian eigenvectors and eigenvalues of the Laplacian matrix, $L_j$, and then normalize the ordered Laplacian eigenvectors to obtain an M×M matrix of orthonormal basis vectors $L_{eigenvectors_j}$.

Step C2.4: construct 1×M vectors representing geometry data of the vertices of $G_j$ across frames f={1,2, . . . , M}, that is, $X_j=\{x_{j,f=1}, x_{j,f=2}, \ldots, x_{j,f=M}\}$, $Y_j=\{y_{j,f=1}, y_{j,f=2}, \ldots, y_{j,f=M}\}$, $Z_j=\{z_{j,f=1}, z_{j,f=2}, \ldots, z_{j,f=M}\}$.

Step C2.5: project the geometry vectors from step C2.4 onto $L_{eigenvectors_j}$ to obtain a 3×M matrix of GFT coefficients $CX_j$, $CY_j$, $CZ_j$, as follows:

$$\begin{aligned} CX_j &= X_j \times L_{eigenvectors_j} \\ CY_j &= Y_j \times L_{eignvectors_j}, \\ CZ_j &= Z_j \times L_{eigenvectors_j} \end{aligned} \tag{6}$$

where operator × indicates matrix multiplication.

Step C2.6: quantize the GFT coefficients (according to a quantization method of choice). The quantized coefficients are denoted $CX'_j$, $CY'_j$, and $CZ'_j$.

Step C2.7: Select the GFT coefficients to be encoded, out of which signal reconstruction can be performed. The method of selection may vary, but the same coefficients (that is, coefficients corresponding to the same eigenvector indices) should be selected for the x, y, and z coefficient vectors. The same coefficients should also be selected across graphs $G_j$, j={1,2, . . . , n}. For example, if 50% of the lowest-frequency coefficients are selected for graph $G_1$, then the same coefficients should be selected for all the other graphs ($G_2$, . . . , $G_n$) to avoid introducing distortions between the reconstructed base mesh vertices. Additionally, to avoid encoding the eigenvector indices, non-selected coefficients should be discarded in a linear manner (i.e., in order and not by non-linear indexing into the coefficient arrays). Alternatively, all the GFT coefficients can be encoded and progressively transmitted to the decoder for the latter to determine when to stop the decoding. For example, the decoder can stop the decoding of received coefficients when the quality of the already reconstructed dynamic base mesh is satisfactory or when the decoder system has reached its bitrate limit.

Step C2.8: entropy-code the (selected) quantized GFT coefficients and transmit them to the decoder. In an aspect, any entropy-coding method can be applied, independently or collectively, to the quantized coefficients of the different graphs $G_j$.

The coded motion data can be decoded by the motion decoder 550, generally reversing the above coding steps C2.1-C2.8, as described in steps D2.1-D2.6 below.

Step D2.1: construct inter-frame graphs, $G_j$, j={1,2, . . . , n}, as in step C2.1.

Then, perform the following steps with respect to each graph, $G_j$, j={1,2, . . . , n}.

Step D2.2: obtain the Laplacian matrix $L_j$ as in step C2.2.

Step D2.3: obtain the orthonormal basis vectors Leigenvectorsj, as in step C2.3.

Step D2.4: decode and dequantize the GFT coefficients corresponding to $G_j$. These dequantized coefficients are denoted $\widehat{\mathbf{CX}}_j$, $\widehat{\mathbf{CY}}_j$, and $\widehat{\mathbf{CZ}}_j$.

Step D2.5: reconstruct the vectors representing the geometry data of the vertices of $G_j$ by linearly combining the reconstructed GFT coefficients $\widehat{\mathbf{CX}}_j$, $\widehat{\mathbf{CY}}_j$, and $\widehat{\mathbf{CZ}}_j$ with their corresponding Laplacian eigenvectors in $$L^T_{eigenvectors_j}$$

as follows:

$$\hat{X}_j = \widehat{\mathbf{CX}}_j \times L^T_{eigenvectors_j}$$
$$\hat{Y}_j = \widehat{\mathbf{CZ}}_j \times L^T_{eigenvectors_j}\,,$$
$$\hat{Z}_j = \widehat{\mathbf{CZ}}_j \times L^T_{eigenvectors_j} \tag{9}$$

where operator × indicates matrix multiplication and where operator T indicates matrix transpose. The motion data can be obtained from geometry data of consecutive corresponding vertices across the inter-frame graph.

Figure 8:
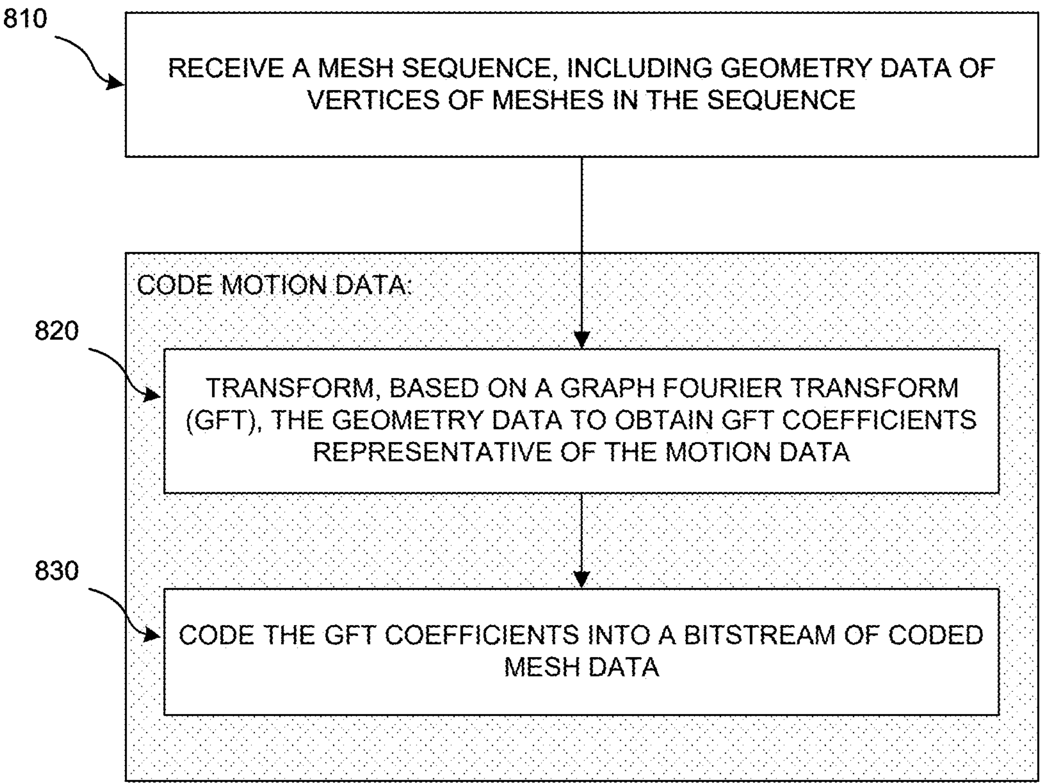
FIG. 8 is a flow diagram of an example method for encoding mesh data, according to aspects of the present disclosure.

FIG. 8 is a flow diagram of an example method 800 for encoding mesh data, according to aspects of the present disclosure. The method 800 begins, in step 810, by receiving a mesh sequence, including geometry data of vertices of meshes in the sequence. The method 800 performs the coding of motion data into a bitstream of coded mesh data (e.g., bitstream 480). The motion data represent spatial displacements between corresponding vertices from respective meshes in the sequence. The coding of the motion data includes, in step 820, based on a GFT, transforming the geometry data of the mesh sequence into GFT coefficients representative of the motion data. The GFT coefficients are then coded, in step 830, into the bitstream. In an aspect, the method 800 further comprises selecting a subset of the GFT coefficients, where only the selected subset of GFT coefficients is coded into the bitstream (e.g., as explained in steps C1.4 and C2.7 above).

In an aspect, motion data are coded using an explicit motion data representation, where the GFT is derived based on intra-frame mesh connectivity of meshes in the sequence (see step C1.1). In this aspect, the method 800 further comprises: 1) transforming, based on the GFT, geometry data associated with vertices of a first mesh of the sequence to obtain a first set of the GFT coefficients (see step C1.2); 2) transforming, based on the GFT, geometry data associated with vertices of a second mesh of the sequence to obtain a second set of the GFT coefficients (see step C1.3); 3) coding the first set of the GFT coefficients (see step C1.5); and 4) coding spectral differences between corresponding GFT coefficients of the first set and of the second set, where the spectral differences represent motion vectors associated with the vertices of the second mesh (see step C1.7-C1.9). The coded first set of the GFT coefficients and the coded spectral differences are then added to the bitstream containing the coded motion data (e.g., bitstream 480).

In another aspect, motion data are coded using implicit motion data representation. In this aspect, the method 800 begins by constructing an inter-frame graph including corresponding vertices across the meshes of the sequence (see step C2.1), and then the GFT is derived based on inter-frame mesh connectivity of the inter-frame graph (see steps C2.2-C2.3). The method 800 further comprises 1) transforming, based on the GFT, geometry data of the vertices across the inter-frame graph to obtain GFT coefficients (see step C2.5), these GFT coefficients represent motion vectors associated with the corresponding vertices across the inter-frame graph; and 2) coding the GFT coefficients (see step C2.8). The coded GFT coefficients are then added to the bitstream containing the coded motion data (e.g., bitstream 480).

Figure 9:
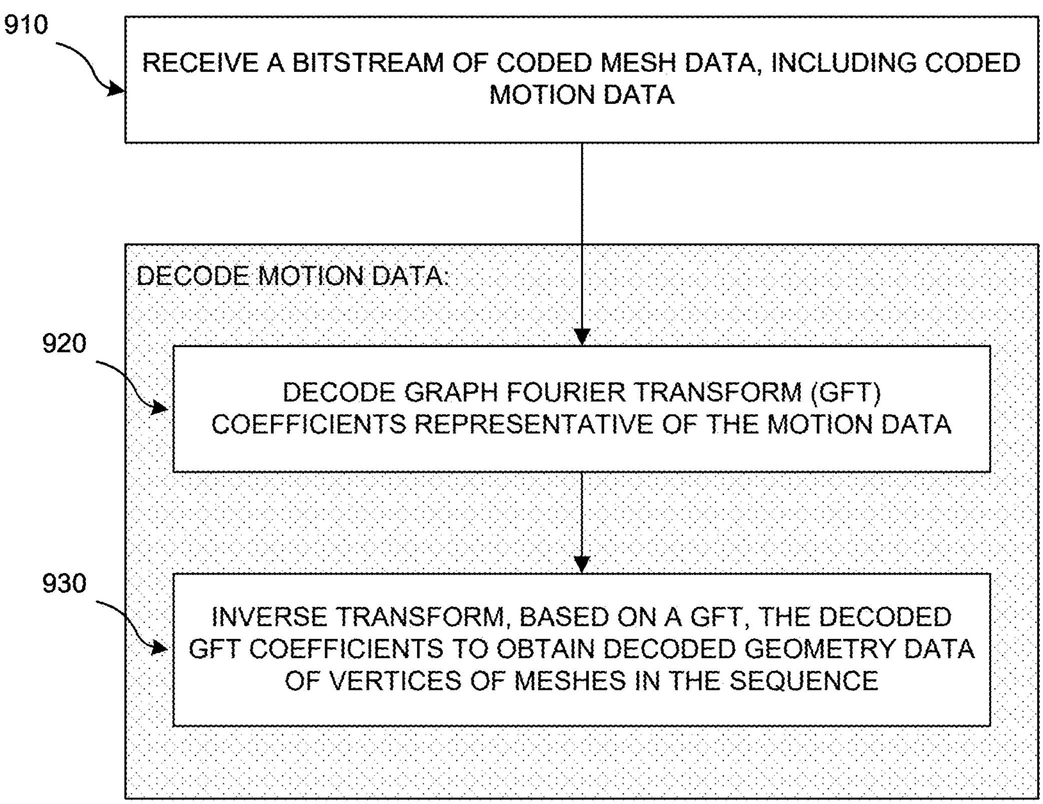
FIG. 9 is a flow diagram of an example method for decoding mesh data, according to aspects of the present disclosure.

FIG. 9 is a flow diagram of an example method 900 for decoding mesh data, according to aspects of the present disclosure. The method 900 begins, in step 910, by receiving a bitstream of coded mesh data, including coded motion data representative of spatial displacements between corresponding vertices from respective meshes in a mesh sequence. The method 900 includes, in steps 920-930, the decoding of the motion data. In step 920, the GFT coefficients, representative of the motion data, are decoded. Then, in step 930, based on a GFT, the decoded GFT coefficients are inverse transformed to obtain decoded geometry data of vertices of meshes in the sequence. The motion data may be obtained from the decoded geometry data. In an aspect, the motion data may be progressively decoded. In this case, only a subset of the GFT coefficients is decoded (and used for reconstruction by the decoder) out of the GFT coefficients that are coded into the bitstream (e.g., as explained in steps C1.4 and C2.7 above).

In the case where the motion data are coded using an explicit motion data representation, where the GFT is derived based on mesh connectivity of meshes in the sequence (see step D1.1), the method 900 further comprises: 1) decoding from the bitstream a first set of GFT coefficients, computed by an encoder based on the GFT using geometry data associated with vertices of a first mesh of the sequence (see step D1.2); 2) decoding from the bitstream spectral differences between corresponding GFT coefficients of the first set and of a second set of GFT coefficients, the second set computed by the encoder based on the GFT using geometry data associated with vertices of a second mesh of the sequence, the decoded spectral differences represent motion vectors associated with the vertices of the second mesh (see step D1.3); 3) inverse transforming, based on the GFT, the GFT coefficients of the first set, obtaining geometry data of the vertices of the first mesh (see step D1.5); 4) obtaining GFT coefficients of the second set by adding corresponding GFT coefficients of the first set and of the spectral differences (see step D1.4); and 5) inverse transforming, based on the GFT, the GFT coefficients of the second set, obtaining geometry data of the vertices of the second mesh (see step D1.5). In this case, the motion vectors may be obtained from geometry data of corresponding vertices of the first mesh and the second mesh.

In the case where the motion data are coded using implicit motion data representation, method 900 begins by constructing an inter-frame graph including corresponding vertices across the meshes of the sequence (see step D2.1), and, then, deriving, based on inter-frame mesh connectivity of corresponding vertices across the inter-frame graph, the GFT (see step D2.2-D2.3). The method 900 further comprises: 1) decoding from the bitstream GFT coefficients, computed by an encoder based on the GFT using geometry data of the corresponding vertices across the inter-frame graph (see step D2.4), where the decoded GFT coefficients represent motion vectors associated with the corresponding vertices across the inter-frame graph; and 2) inverse transforming, based on the GFT, the decoded GFT coefficients, obtaining geometry data of vertices across the inter-frame graph (see step D2.5). In this case, the motion vectors may be obtained from geometry data of consecutive corresponding vertices across the inter-frame graph.

The illustrations of the aspects described herein are intended to provide a general understanding of the structure, function, and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method for encoding mesh data, comprising:

receiving a mesh sequence, including geometry data of vertices of meshes in the sequence; and coding motion data into a bitstream of coded mesh data, the motion data represent spatial displacements between corresponding vertices from respective meshes in the sequence, the motion data coding comprises:

transforming, based on a Graph Fourier Transform (GFT), the geometry data to obtain GFT coefficients representative of the motion data, and coding the GFT coefficients into the bitstream.

2. The method according to claim 1, wherein the coding of the motion data further comprises:

selecting a subset of the GFT coefficients, wherein the coding of the GFT coefficients comprises coding the selected subset of GFT coefficients.

3. The method according to claim 1, wherein the coding of the motion data further comprises:

deriving, based on intra-frame mesh connectivity of meshes in the sequence, the GFT.

4. The method according to claim 3, wherein the coding of the motion data further comprises:

transforming, based on the GFT, geometry data associated with vertices of a first mesh of the sequence, obtaining a first set of the GFT coefficients;

transforming, based on the GFT, geometry data associated with vertices of a second mesh of the sequence, obtaining a second set of the GFT coefficients;

coding the first set of the GFT coefficients; and coding spectral differences between corresponding GFT coefficients of the first set and of the second set, wherein the spectral differences represent motion vectors associated with the vertices of the second mesh, wherein, the coded motion data include the coded first set and the coded spectral differences.

5. The method according to claim 1, wherein the coding of the motion data further comprises:

constructing an inter-frame graph including corresponding vertices across the meshes of the sequence; and deriving, based on inter-frame mesh connectivity of the inter-frame graph, the GFT.

6. The method according to claim 5, wherein the coding of the motion data further comprises:

transforming, based on the GFT, geometry data of vertices across the inter-frame graph, obtaining GFT coefficients, wherein the GFT coefficients represent motion vectors associated with corresponding vertices across the inter-frame graph; and coding the GFT coefficients, wherein, the coded motion data include the coded GFT coefficients.

7. A method for decoding mesh data, comprising:

receiving a bitstream of coded mesh data, including coded motion data representative of spatial displacements between corresponding vertices from respective meshes in a mesh sequence; and decoding the motion data from the bitstream, the motion data decoding comprises:

decoding GFT coefficients representative of the motion data, and inverse transforming, based on a GFT, the decoded GFT coefficients to obtain decoded geometry data of vertices of meshes in the sequence.

8. The method according to claim 7, wherein the decoding of the motion data further comprises:

progressively decoding the motion data, wherein the decoding of the GFT coefficients comprises decoding a subset of the GFT coefficients coded into the bitstream.

9. The method according to claim 7, wherein the decoding of the motion data further comprises:

deriving, based on intra-frame mesh connectivity of meshes in the sequence, the GFT.

10. The method according to claim 9, wherein the decoding of the motion data further comprises:

decoding from the bitstream a first set of GFT coefficients, computed by an encoder based on the GFT using geometry data associated with vertices of a first mesh of the sequence;

decoding from the bitstream spectral differences, the spectral differences are between corresponding GFT coefficients of the first set and of a second set of GFT coefficients, the second set computed by the encoder based on the GFT using geometry data associated with vertices of a second mesh of the sequence, wherein the spectral differences represent motion vectors associated with the vertices of the second mesh;

inverse transforming, based on the GFT, the GFT coefficients of the first set, obtaining geometry data of the vertices of the first mesh;

obtaining GFT coefficients of the second set by adding corresponding GFT coefficients of the first set and of the spectral differences; and inverse transforming, based on the GFT, the GFT coefficients of the second set, obtaining geometry data of the vertices of the second mesh.

11. The method according to claim 10, further comprising:

obtaining the motion vectors from geometry data of corresponding vertices of the first mesh and the second mesh.

12. The method according to claim 7, wherein the decoding of the motion data further comprises:

constructing an inter-frame graph including corresponding vertices across the meshes of the sequence; and deriving, based on inter-frame mesh connectivity of the inter-frame graph, the GFT.

13. The method according to claim 12, wherein the decoding of the motion data further comprises:

decoding from the bitstream GFT coefficients, computed by an encoder based on the GFT using geometry data of corresponding vertices across the inter-frame graph, wherein the GFT coefficients represent motion vectors associated with corresponding vertices across the inter-frame graph; and inverse transforming, based on the GFT, the decoded GFT coefficients, obtaining geometry data of vertices across the inter-frame graph.

14. The method according to claim 13, further comprising:

obtaining the motion vectors from geometry data of consecutive vertices across the inter-frame graph.

15. An apparatus for encoding mesh data, comprising:

at least one processor; and memory storing instructions that, when executed by the at least one processor, cause the apparatus to:

receive a mesh sequence, including geometry data of vertices of meshes in the sequence, and code motion data into a bitstream of coded mesh data, the motion data represent spatial displacements between corresponding vertices from respective meshes in the sequence, the motion data coding comprises:

transforming, based on a GFT, the geometry data to obtain GFT coefficients representative of the motion data, and coding the GFT coefficients into the bitstream.

16. The apparatus according to claim 15, wherein the instructions further cause the apparatus to:

select a subset of the GFT coefficients, wherein the coding of the GFT coefficients comprises coding the selected subset of GFT coefficients.

17. The apparatus according to claim 15, wherein the instructions further cause the apparatus to:

derive, based on intra-frame mesh connectivity of meshes in the sequence, the GFT.

18. The apparatus according to claim 15, wherein the instructions further cause the apparatus to:

construct an inter-frame graph including corresponding vertices across the meshes of the sequence; and derive, based on inter-frame mesh connectivity of the inter-frame graph, the GFT.

19. An apparatus for decoding mesh data, comprising:

at least one processor; and memory storing instructions that, when executed by the at least one processor, cause the apparatus to:

receive a bitstream of coded mesh data, including coded motion data representative of spatial displacements between corresponding vertices from respective meshes in a mesh sequence, and decode the motion data from the bitstream, the motion data decoding comprises:

decoding GFT coefficients representative of the motion data, and inverse transforming, based on a GFT, the decoded GFT coefficients to obtain decoded geometry data of vertices of meshes in the sequence.

20. The apparatus according to claim 19, wherein the instructions further cause the apparatus to:

progressively decode the motion data, wherein the decoding of the GFT coefficients comprises decoding a subset of the GFT coefficients coded into the bitstream.

21. The apparatus according to claim 19, wherein the instructions further cause the apparatus to:

derive, based on intra-frame mesh connectivity of meshes in the sequence, the GFT.

22. The apparatus according to claim 19, wherein the instructions further cause the apparatus to:

construct an inter-frame graph including corresponding vertices across the meshes of the sequence; and derive, based on inter-frame mesh connectivity of the inter-frame graph, the GFT.

23. A non-transitory computer-readable medium comprising instructions executable by at least one processor to perform a method for encoding mesh data, the method comprising:

receiving a mesh sequence, including geometry data of vertices of meshes in the sequence; and coding motion data into a bitstream of coded mesh data, the motion data represent spatial displacements between corresponding vertices from respective meshes in the sequence, the motion data coding comprises:

transforming, based on a GFT, the geometry data to obtain GFT coefficients representative of the motion data, and coding the GFT coefficients into the bitstream.

24. A non-transitory computer-readable medium comprising instructions executable by at least one processor to perform a method for decoding mesh data, the method comprising:

receiving a bitstream of coded mesh data, including coded motion data representative of spatial displacements between corresponding vertices from respective meshes in a mesh sequence; and decoding the motion data from the bitstream, the motion data decoding comprises:

decoding GFT coefficients representative of the motion data, and inverse transforming, based on a GFT, the decoded GFT coefficients to obtain decoded geometry data of vertices of meshes in the sequence.

* * * * *